(12) United States Patent
Baudisch et al.

(10) Patent No.: US 7,293,246 B2
(45) Date of Patent: Nov. 6, 2007

(54) SYSTEM AND METHOD FOR ALIGNING OBJECTS USING NON-LINEAR POINTER MOVEMENT

(75) Inventors: Patrick M Baudisch, Seattle, WA (US); Adam Eversole, Redmond, WA (US); Paul S Hellyar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 10/828,890

(22) Filed: Apr. 21, 2004

(65) Prior Publication Data

US 2005/0240877 A1     Oct. 27, 2005

(51) Int. Cl.
*G06F 3/048*     (2006.01)
*G06F 3/01*     (2006.01)

(52) U.S. Cl. ............ 715/858; 715/856; 715/857; 715/862; 715/701; 715/799

(58) Field of Classification Search ........... 715/701, 715/862, 856, 858, 857
See application file for complete search history.

(56) References Cited

U.S. PATENT DOCUMENTS

| | | | | | |
|---|---|---|---|---|---|
| 5,123,087 | A | * | 6/1992 | Newell et al. ............ | 715/862 |
| 5,164,713 | A | * | 11/1992 | Bain ........................ | 715/862 |
| 5,596,347 | A | * | 1/1997 | Robertson et al. ......... | 715/856 |
| 5,642,131 | A | * | 6/1997 | Pekelney et al. .......... | 715/862 |
| 5,655,095 | A | * | 8/1997 | LoNegro et al. ........... | 715/825 |
| 5,703,620 | A | * | 12/1997 | Keyson .................... | 715/856 |
| 5,732,228 | A | * | 3/1998 | Jaaskelainen, Jr. ......... | 715/862 |
| 5,774,111 | A | * | 6/1998 | Lecland et al. ............ | 715/856 |
| 5,786,805 | A | * | 7/1998 | Barry ...................... | 345/159 |
| 5,815,137 | A | * | 9/1998 | Weatherford et al. ...... | 715/861 |
| 5,870,079 | A | * | 2/1999 | Hennessy .................. | 345/159 |
| 5,933,138 | A | * | 8/1999 | Driskell .................... | 715/702 |
| 5,973,670 | A | * | 10/1999 | Barber et al. .............. | 345/157 |
| 6,078,308 | A |   | 6/2000 | Rosenberg et al. | |
| 6,392,675 | B1 | * | 5/2002 | Becker et al. ............. | 715/858 |
| 6,480,813 | B1 | * | 11/2002 | Bloomquist et al. ......... | 703/1 |
| 6,587,131 | B1 | * | 7/2003 | Nakai et al. .............. | 715/857 |
| 6,654,003 | B2 | * | 11/2003 | Boldy ..................... | 345/157 |
| 6,867,790 | B1 | * | 3/2005 | Brooks ..................... | 715/856 |
| 6,907,581 | B2 | * | 6/2005 | Noy et al. ................. | 715/863 |
| 7,098,933 | B1 | * | 8/2006 | Thoemmes et al. ......... | 345/677 |

OTHER PUBLICATIONS

Douglas, S.A., et al., "Testing Pointing Device Performance and User Assessment with the ISO 9241, Part 9 Standard," *Proc. CHI '99*, Pittsburgh, Pennsylvania, May 15-20, 1999, pp. 215-222.

(Continued)

*Primary Examiner*—John Cabeca
*Assistant Examiner*—Nicholas S Ulrich
(74) *Attorney, Agent, or Firm*—Christensen O'Connor Johnson Kindness PLLC

(57) ABSTRACT

The present invention provides a system, method, and computer-readable medium that adjusts pointer movement when an input device causes the pointer to intersect one or more alignment areas. Pointer movement is adjusted in the alignment areas to allow users to easily align GUI objects. The adjusted pointer movement is not proportional to input received from an input device. Instead alignment areas have "friction" in that the pointer is less responsive to input compared to other areas of the computer display.

28 Claims, 10 Drawing Sheets

OTHER PUBLICATIONS

Dulberg, M.S., et al., "An Imprecise Mouse Gesture for the Fast Activation of Controls," *Proc. Interact '99*, Edinburgh, Scotland, Aug. 30-Sep. 3, 1999, pp. 375-382.

Johanson, B., et al., "PointRight: Experience with Flexible Input Redirection in Interactive Workspaces," *Proc. UIST '02*, Paris, France, Oct. 27-30, 2002, pp. 227-234.

McGuffin, M., and R. Balakrishnan, "Acquisition of Expanding Targets," *Proc. CHI 2002*, Minneapolis, Minnesota, Apr. 20-25, 2002, pp. 57-64.

Moyle, M., and A. Cockburn, "Analysing Mouse and Pen Flick Gestures," *Proc. of the SIGCHI-NZ Symposium On Computer-Human Interaction 2002*, Hamilton, New Zealand, Jul. 11-12, 2002, pp. 67-64.

Worden, A., et al., "Making Computers Easier for Older Adults to Use: Area Cursors and Sticky Icons," *Proc. CHI '97*, Atlanta, Georgia, , Mar. 22-27, 1997, pp. 22-27.

\* cited by examiner

SYSTEM AND METHOD FOR ALIGNING OBJECTS USING NON-LINEAR POINTER MOVEMENT

FIELD OF THE INVENTION

The present invention relates in general to an improved graphical user interface. More specifically the present invention relates to an improved system and method of aligning objects in a graphical user interface.

BACKGROUND OF THE INVENTION

A great number of computer devices (e.g., personal computer, personal digital assistants ("PDAs"), cellular telephones, etc.) employ a graphical user interface (hereinafter "GUI") to interact with users. A GUI is an input/output (I/O) system characterized by the use of graphics on a computer display to communicate with a computer user. Frequently, the user employs an input device, such as a mouse or trackball, to manipulate and relocate a pointer on the computer display. When a user activates or "clicks" the input device while the pointer is at a designated position on the display, information is input into a computer device. Accordingly, a user does not need to memorize commands or have a knowledge of keyboard typing to provide input to the computer device.

A GUI generally presents graphical display elements (hereinafter "GUI objects") as two-dimensional images of pixels on a computer display. Often, users want to align GUI objects in order to perform a desired function or create documents with specific characteristics. For example, to create a document with a professional appearance, users may want to align GUI objects at the same vertical or horizontal position. One alignment task that is particularly common is "stacking" GUI objects so they are aligned in succession on a computer display.

Frequently, users align GUI objects using a "click and drag" technique where a single pointer event such as a button click selects the GUI object. Once the GUI object is selected, the pointer moves the GUI object to a new location where a second pointer event places the GUI object. Using dragging, aligning two or more GUI objects is often difficult to accomplish, leading to frustration and lowered productivity. In some instances, users with diminished visual or physical abilities, or lack of training have difficulty correctly positioning the dragged object. In other instances, pointer positioning difficulty may be attributable to the computer device.

An inability to place an object at a specific location on a computer display creates problems because the desired function may not easily be performed. Instead, the user may need to repetitively re-adjust the pointer to perform the desired function. Systems have been developed that improve on the "click and drag" technique used to align GUI objects. For example, some systems support a "snapping" option where a GUI object is automatically moved (i.e., snapped) when positioned within a predetermined distance relative to an aligned coordinate position. A drawback to this approach is that GUI objects may not be positioned less than the predetermined distance from the aligned coordinate position. Stated differently, a user may not place a GUI object close to, but not at, the aligned coordinate position without the object "snapping" to the aligned coordinate position. Another drawback to this approach is that a user must activate the snapping option by, for example, selecting a menu item from a pull-down menu. Some users may not know that options such as "snapping" are available, and may continue to use the "click and drag" technique. As described above, this approach leads to frustration because users are often required to repetitively re-adjust the position of the pointer in order to accurately place the object being dragged.

What is needed is a system and method for aligning GUI objects that allows placement of GUI objects at any location on a computer display. Desirably, the system and method should be easy to use and not require knowledge or training on the part of the user. The present invention addresses these needs and other shortcomings that currently exist.

SUMMARY OF THE INVENTION

Conventionally, pointer movement on a computer display is proportional to the input received from an input device (i.e., trackball, mouse, etc.). The present invention is generally directed to aligning GUI objects with pointer movement that is not proportional to input received from an input device. More specifically, embodiments of the present invention provide a system, method, and computer-readable medium that adjust pointer movement when a pointer with a selected GUI object is intersects with an alignment area. The alignment areas are derived from specified locations in GUI objects such as a connection point or shape vertices. Since each GUI object has different locations that designate an aligned coordinate position, alignment areas vary depending on the GUI objects being aligned. When an alignment area is intersected, pointer movement is adjusted so that a proportionally larger amount of input is required to affect movement of the pointer. For example, a larger amount of input device movement is required to move the pointer an incremental distance on a computer display. From the user's perspective, alignment areas have "friction" in that the pointer is less responsive when compared to other areas of the computer display.

One embodiment of the present invention is a method that adjusts pointer movement when input causes the pointer to intersect one or more alignment areas. The method is implemented by a set of event-driven routines that determine if the projected movement of the pointer will intersect an alignment area. If the projected movement does not intersect an alignment area, already realized pointer positioning software computes the coordinate position of the pointer. Conversely, if the projected movement does intersect an alignment area, the method computes an adjusted coordinate position for the pointer. The calculation adjusts the pointer movement so that a proportionally larger amount of input is required to affect movement of the pointer in the alignment area.

In another embodiment of the present invention, a computer device is described that adjusts pointer movement when input causes the pointer to intersect one or more alignment areas. The computer device includes an operating system in communication with various components including an input device, a computer display, a movement adjustment module, and one or more application programs. The movement adjustment module is configured to adjust the coordinate position of the pointer when it intersects one or more alignment areas.

In still another embodiment, a computer-readable medium is provided with contents, i.e., a program that causes a computer device to operate in accordance with the method described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide a system, method, and computer-readable medium that adjusts pointer movement when an input device causes a pointer to intersect one or more alignment areas. As known to those skilled in the art and others, a pointer is a pictorial depiction used to input information into a computer device and is typically represented with an arrow. However, pointers may be represented with any pictorial depiction capable of identifying a "hot spot" on a computer display. In accordance with the present invention, pointer movement is adjusted to assist users align GUI objects. When the pointer intersects an alignment area a proportionally larger amount of input (i.e., a greater amount of pointer input device movement) is required to affect movement of the pointer. Thus, inadvertent, small movement of an input device does not cause the pointer to leave an alignment area.

The following description first provides an overview of a system in which the present invention may be implemented. Then a method that adjusts pointer movement when input causes the pointer to intersect one or more alignment areas, which is shown in accompanying diagrams, is described. The illustrative examples described herein are not intended to be exhaustive or to limit the invention to the precise forms disclosed. Similarly, any steps described herein may be interchangeable with other steps, or combinations of steps, in order to achieve the same result.

Figure 1:
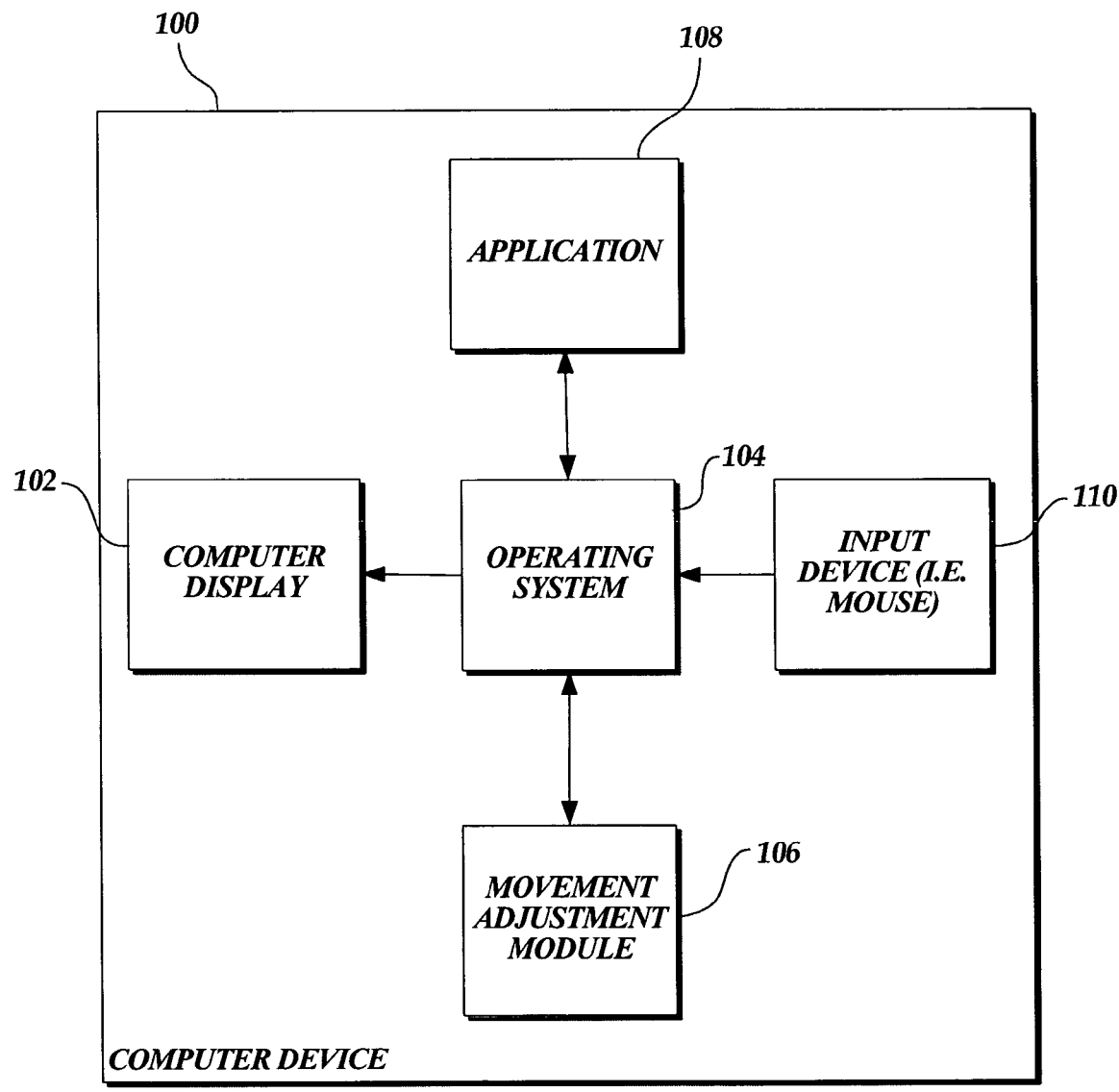
FIG. 1 is a block diagram of the components of a computer device including a movement adjustment module that is suitable for adjusting pointer movement in accordance with the present invention.

FIG. 1 provides an exemplary overview of a computer device 100 in which embodiments of the invention may be implemented. The computer device 100 includes a computer display 102, an operating system 104, a movement adjustment module 106, an application 108, and an input device 110. The computer device 100 may be any one of a variety of devices including, but not limited to, personal computer devices, server-based computer devices, personal digital assistants, cellular telephones, other electronic devices having some type of memory, and the like. For ease of illustration and because they are not important for an understanding of the present invention, FIG. 1 does not show some of the typical components of many computer devices such as memory, keyboard, central processing unit, and the like.

The operating system 104 may be a general-purpose operating system such as a Microsoft® operating system, UNIX® operating system, or Linux® operating system. As known to those skilled in the art and others, the operating system 104 controls the general operation of the computer device 100 and is responsible for management of hardware and basic system operations, as well as running applications. More specifically, the operating system 104 ensures that computer programs, such as application 108, are able to use hardware resources. As illustrated in FIG. 1, the operating system 104 communicates with the computer display 102 which may include typical display devices, such as a monitor (e.g., CRT or LCD screen), a television, etc. The computer display 102 is suitable to display a pointer and other GUI objects.

The computer device 100 is configured to execute computer programs such as application 108, which causes GUI objects to be displayed on the computer display 102. Application 108 may be any computer program which displays GUI objects including, but not limited to, editors, word processors, spreadsheets, browsers, computer-aided design, and the like.

The input device 110 interacts with a user and the operating system 104 to specify event-driven routines to execute. As known to those skilled in the art and others, the input device 110 may be any device capable of controlling a pointer on the computer display 102 including a mouse, trackball, touch pad, etc. In some computer devices, input device 110 may be contained within the same housing as the computer device 100. Such arrangements are commonly found where the computer device is a notebook computer. The user may operate the input device 110 to manipulate and relocate the pointer and activate the pointer at designated positions on the computer display 102. The operating system 104 monitors pointer movement and other pointer events and provides a mechanism for computer programs, such as application 108, to perform actions in response to these events.

As will be better understood from the following description, embodiments of the present invention are implemented by a set of event-driven routines located in the movement adjustment module 106. As illustrated in FIG. 1 the movement adjustment module 106 is interconnected and able to communicate with the operating system 104. As described in more detail below, the operating system 104 notifies the movement adjustment module 106 when the input device 110 is generating pointer movement. The movement adjustment module 106 determines if the projected movement will intersect an alignment area, which may be a grid point, handle, connection point, shape vertices, shape extension, or any other area of the computer display capable of aligning GUI objects. If the projected movement does intersect an alignment area, the movement adjustment module 106 adjusts pointer movement so that GUI objects may easily be aligned. The operating system 104 receives adjusted coordinate positions from the movement adjustment module 106 and causes the computer display 102 to display the pointer at the adjusted coordinates.

When software formed in accordance with the invention is implemented in a computer device, for example of the type illustrated in FIG. 1, the computer device provides a way for users to easily align GUI objects. Allowing a user to easily align GUI objects enhances the computer experience by making computer programs easier to use.

Figure 2:
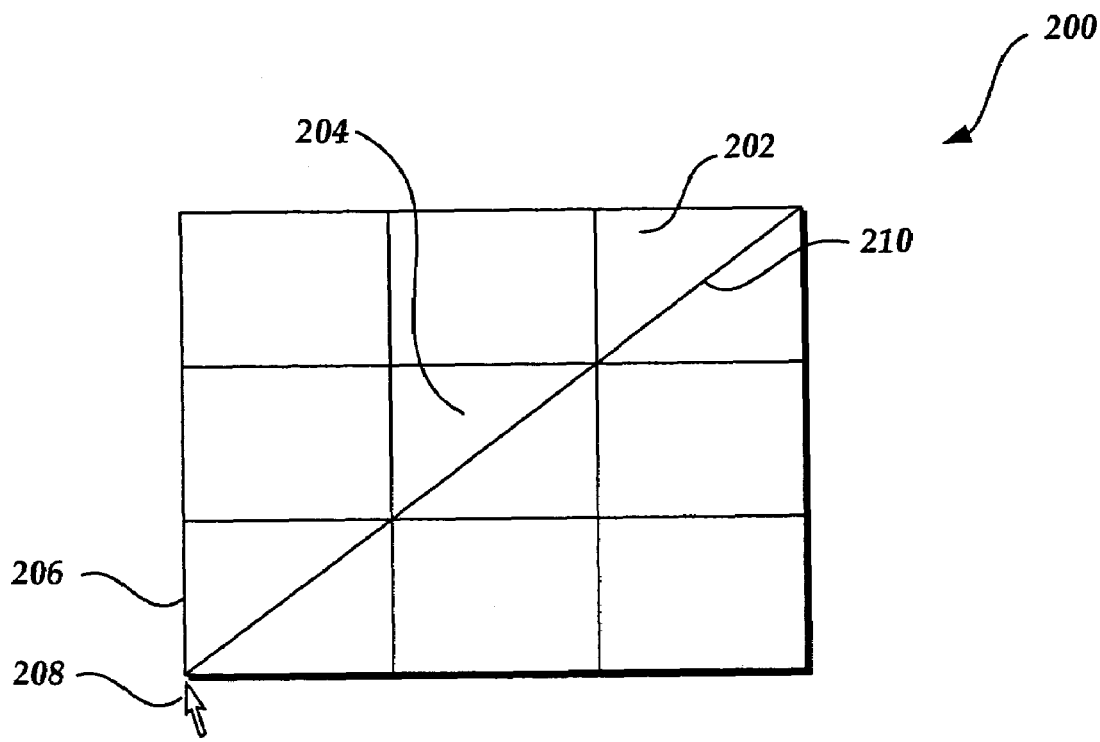
FIG. 2 is a pictorial depiction of a section of computer display that illustrates pointer movement in accordance with the prior art.

For illustrative purposes, a representative section of computer display is depicted in FIG. 2. As known to those skilled in the art, a computer display is composed of pixels which are the basic units used to represent images. Pixels are so small and numerous that, when displayed they appear to merge into a single smooth image. The number of pixels represented on a computer display is called the pixel resolution. Typically, pixel resolutions are expressed as a pair of numbers such as 640×480 which indicates that a computer display is composed of 640 pixels horizontally and 480 pixels vertically (or 640×480=307,200 pixels total). FIG. 2 is a pictorial depiction of a sample section of computer display 200 that contains a set of highly magnified pixels. More specifically, the sample section of computer display 200 contains pixels 202, 204, 206, a pointer 208, and a path 210 that represents pointer 208 movement. As shown in FIG. 2, a user employed input device, such as input device 110, is used to relocate the pointer 208 across pixels 202, 204, and 206. The pointer 208 movement illustrated in FIG. 2 is proportional to the input generated by the user.

Figure 3:
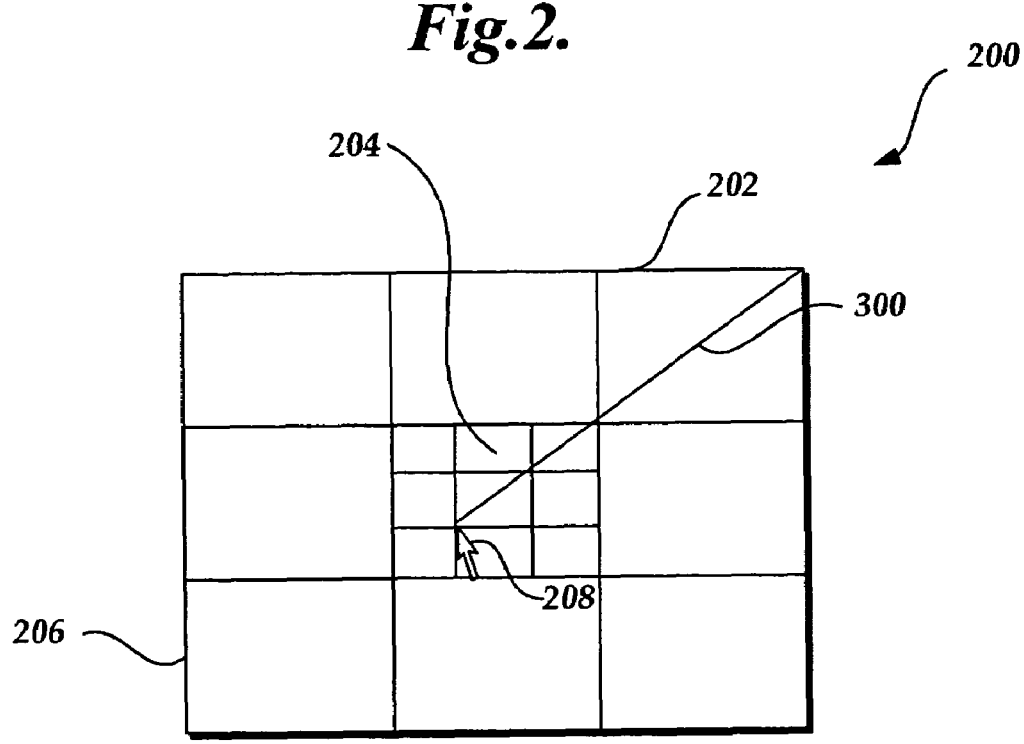
FIG. 3 is a pictorial depiction of the section of computer display illustrated in FIG. 2, wherein one pixel of the computer display is designated as an alignment area in accordance with the present invention.

FIG. 3 illustrates the sample section of computer display 200 depicted in FIG. 2 wherein pixel 204 is designated as an alignment area in accordance with the present invention. Similar to FIG. 2, a user employed input device, such as input device 110, is used to relocate the pointer 208 across pixel 202. However, when the pointer 208 intersects pixel 204, embodiments of the present invention adjust movement of the pointer so that a proportionally greater amount of input (i.e., mouse distance movement) is required to cause a predetermined amount of pointer movement. In other words, the ratio of mouse distance movement to point distance movement changes. As illustrated, the amount of mouse or other input device distance movement required to traverse pixel 204 is three times greater than the amount required to traverse other areas of the computer display 200. Thus, the path 300 generated by the pointer 208 in FIG. 3 is representative of the same amount of input (i.e., mouse movement) as depicted by the path 210 in FIG. 2. From the user's perspective, pixel 204 has "friction" in that pointer movement requires more input (i.e., mouse distance movement) across pixel 204 compared to other areas of the computer display 200.

Figure 4:
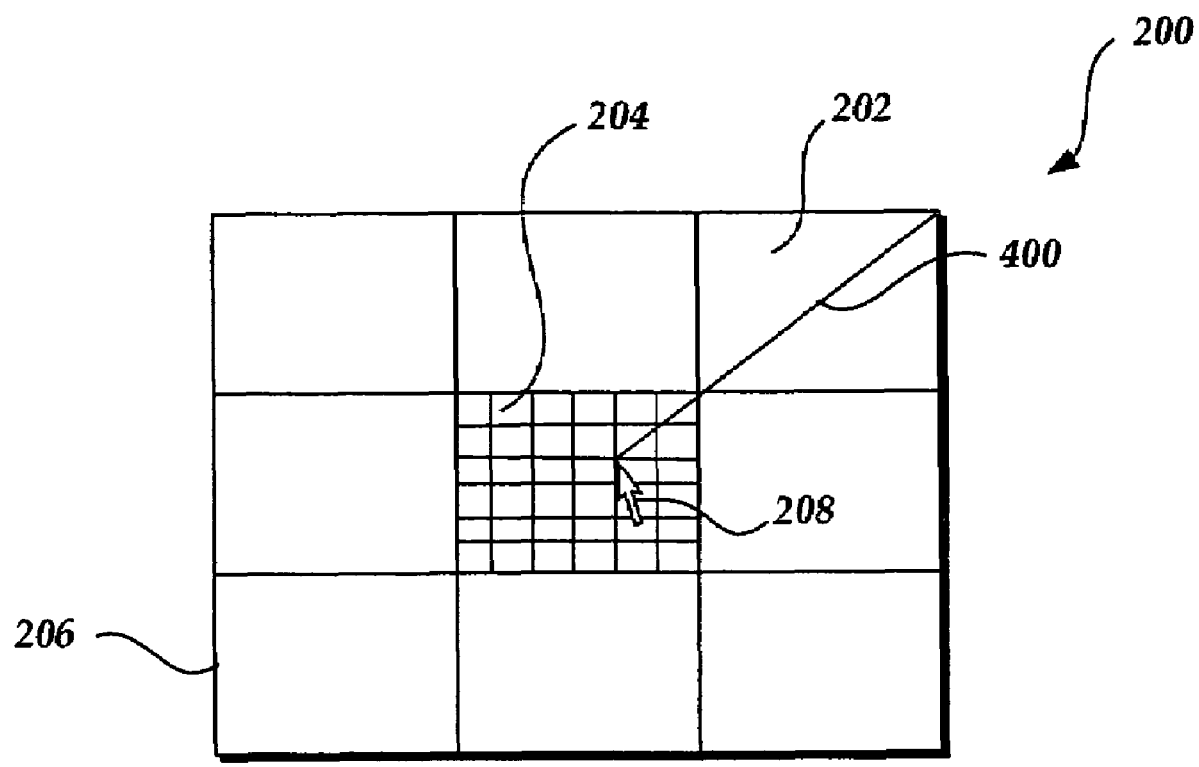
FIG. 4 is an alternative pictorial depiction of the section of computer display illustrated in FIG. 2, wherein one pixel of the computer display is designated as an alignment area in accordance with the present invention.

FIG. 4 is an alternative illustration of the sample section of computer display 200 depicted in FIGS. 2-3 wherein pixel 204 is designated as an alignment area. Similar to FIG. 3, a user employs an input device to traverse a portion of the computer display 200. However, in this illustrative embodiment of the present invention the pointer position is adjusted so that the input required to traverse pixel 204 is six times greater than the input required to traverse other areas of the computer display 200. The path 400 generated by the pointer 208 in FIG. 4 is representative of the same amount of input (i.e., mouse distance movement) as depicted by the path 210 in FIG. 2 and the path 300 in FIG. 3.

As will be readily understood from the foregoing descriptions of FIGS. 3 and 4, the degree with which an alignment area resists pointer movement (hereinafter "friction factor") may vary based on the use of the invention. For example, if a GUI is designed specifically for users with diminished visual or physical abilities, alignment areas may be implemented with a high friction factor in order to compensate for the reduced abilities of the users.

With reference now to FIGS. 5-8, other exemplary aspects of the present invention will be described. For the sake of convenience, much of the description herein is provided in the context of specific GUI objects, but it should be well understood that the present invention is applicable to other GUI objects. Thus, references herein to specific GUI objects are only illustrative and should not be construed as limiting of the invention.

Figure 5:
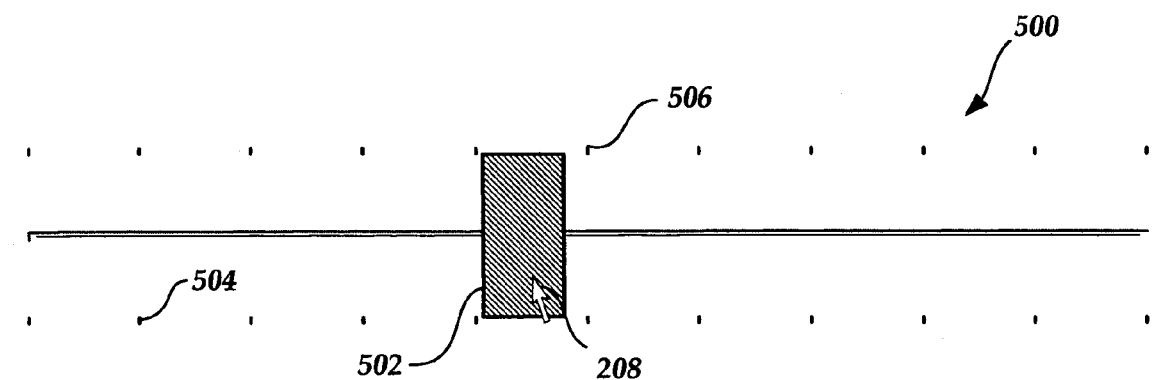
FIG. 5 is a pictorial depiction of a slider that illustrates alignment of GUI objects in accordance with the prior art.

FIG. 5 illustrates a mechanism implemented by many computer programs commonly referred to as a slider 500. The slider 500 comprises more than one GUI object including a control button 502, a scale 504, and one or more scale indicators including scale indicator 506. As well known to those skilled in the art, the slider 500 is operated by a user selecting the control button 502 with the pointer 208 and moving the control button 502 along the scale 504. Typically, a slider 500 controls the value of a variable such as the volume level of sound played by speakers connected to a personal computer. Since users may not be able to easily position the pointer 208 at the values represented by scale indicators, such as scale indicator 506, systems have been developed to assist users in aligning the control button 502. One system, illustrated in FIG. 5 is commonly referred to as snapping. With snapping, the control button 502 is automatically moved (i.e., snapped) when located within a predetermined distance 508 to scale indicator 506. A disadvantage of snapping is that the control button 502 cannot be positioned within the predetermined distance 508. Thus, a section of the scale 504 is inert space not capable of being accessed.

Figure 6:
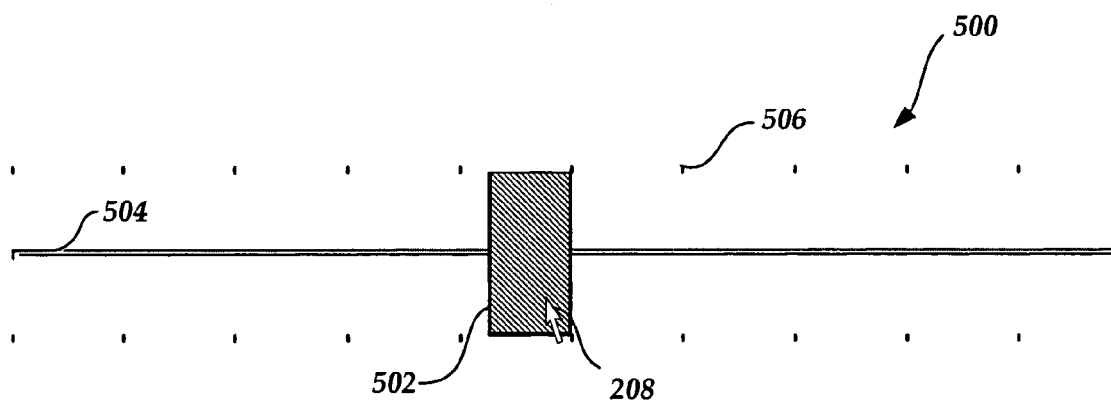
FIG. 6 is a pictorial depiction of the slider of FIG. 5, wherein the slider includes an alignment area in accordance with the present invention.

FIG. 6 illustrates the slider 500 depicted in FIG. 5 located in an alignment area created in accordance with the present invention. Similar to FIG. 5, the user is able to select the control button 502 with the pointer 208 and move the control button 502 along the scale 504. Contrary to FIG. 5, in order to assist users in aligning the control button 502 at the values close to the scale indicator 506, movement of the pointer 208 is adjusted. For a constant amount of input device movement, pointer 208 movement slows when the value represented by scale indicator 506 is achieved. Designating a region adjacent to a scale indicator 506 as an alignment area allows users to easily position the control button 502 close to the scale indicator 506 without snapping to the scale indicator location. Alignment of the control button 502 in this manner gives users access to additional positions along the scale 504.

Figure 7:
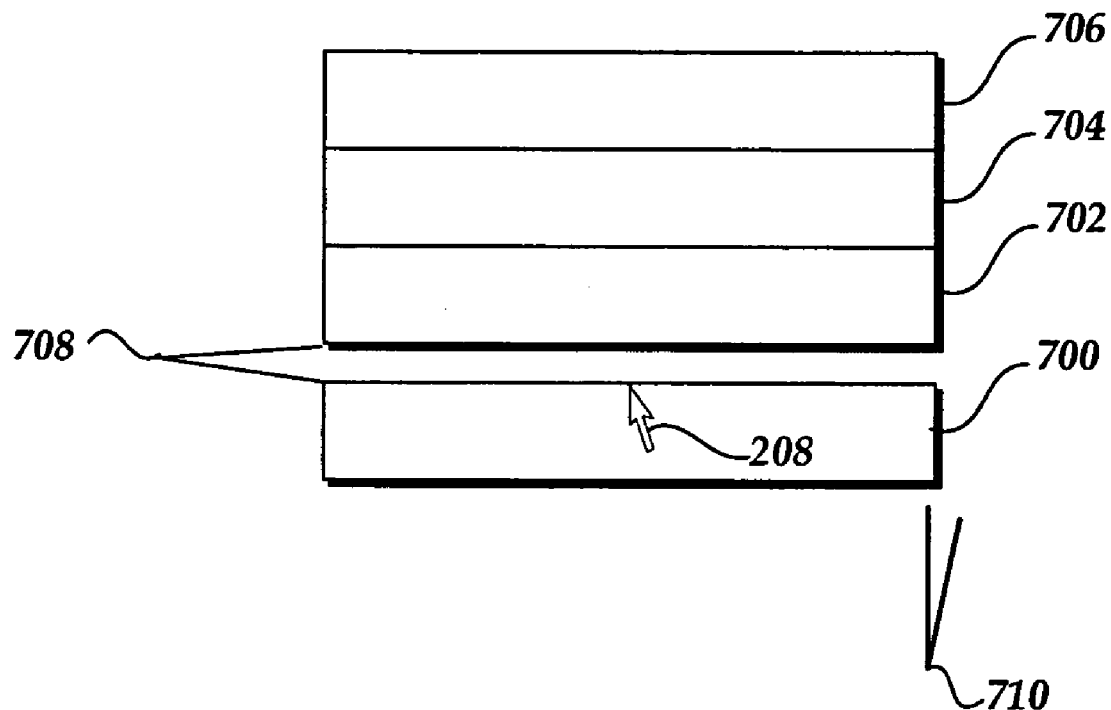
FIG. 7 is a pictorial depiction of GUI objects that illustrate alignment of GUI objects in accordance with the prior art.
Figure 8:
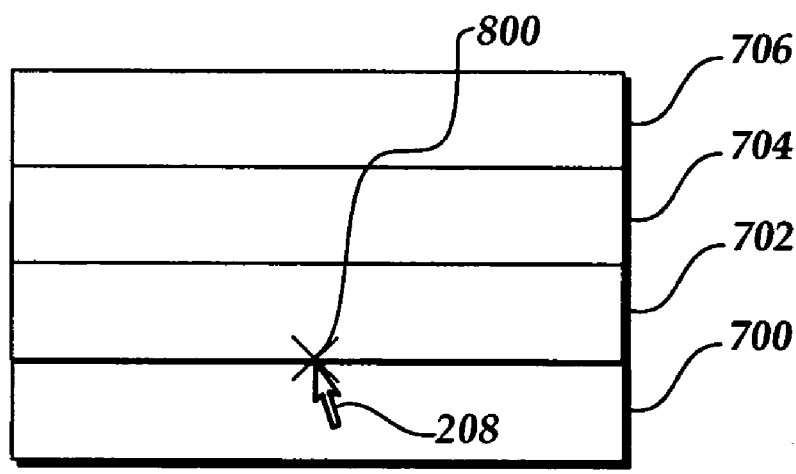
FIG. 8 is a pictorial depiction of the GUI objects illustrated in FIG. 7, wherein one GUI object includes an alignment area in accordance with the present invention.

FIG. 6 illustrates an aspect of the present invention in a one-dimensional environment where the vertical position of two GUI objects are aligned. FIGS. 7 and 8 illustrate an aspect of the present invention in a two-dimensional environment. More specifically, FIGS. 7 and 8 illustrate an activity performed in some computer programs commonly referred to as stacking. In FIG. 7, a GUI object 700 is shown located in an aligned position below a three-level stack of GUI objects 702, 704, and 706. The technique of snapping, described above, is also applicable in two-dimensional environments. However, when snapping occurs in a two-dimensional environment, at least two predetermined areas become inert space that are not available for the positioning of GUI objects. In the example illustrated in FIG. 7, a vertical axis predetermined distance 708 and a horizontal axis predetermined distance 710 are inaccessible for the positioning of GUI object 700.

FIG. 8 illustrates the GUI objects depicted in FIG. 7 positioned such that GUI object 702 is located in a zone generally defined by vertical axis predetermined distance 708 and horizontal axis predetermined distance 710. Pointer movement is adjusted in the alignment area connection point 800 such that the pointer 208 slows down when the coordinate position of the connection point is achieved. In one embodiment of the present invention, visual, auditory, or visual feedback is provided to the user when the pointer 208 is located at the exact coordinate position as the connection point 800. The feedback indicates to the user that the GUI object 700 is properly aligned.

FIG. 8 illustrates one exemplary aspect of the present invention in the context of stacking GUI objects. In the exemplary aspect illustrated in FIG. 8, a connection point 800 is designated as an alignment area that allows GUI objects to be more easily aligned. However, it should be understood that GUI objects may be aligned in other ways. For example, GUI objects may only be aligned vertically or horizontally, without touching, so that the GUI objects have the same x-coordinate or y-coordinate, respectively. Also, varying the size, shape, and location of alignment areas allows GUI objects to be more easily aligned at specific angles in relation to each other.

Aspects of the present invention may be implemented in combination with acquisition aids that guide a pointer to an alignment area. A more detailed explanation of a method, system, and computer-readable medium that guides a pointer to specific areas on a computer display may be found in commonly assigned, co-pending U.S. patent application Ser. No. 10/829,127, titled System and Method For Acquiring a Target With Intelligent Pointer Movement, filed concurrently herewith, the content of which is expressly incorporated herein by reference.

Figure 9:
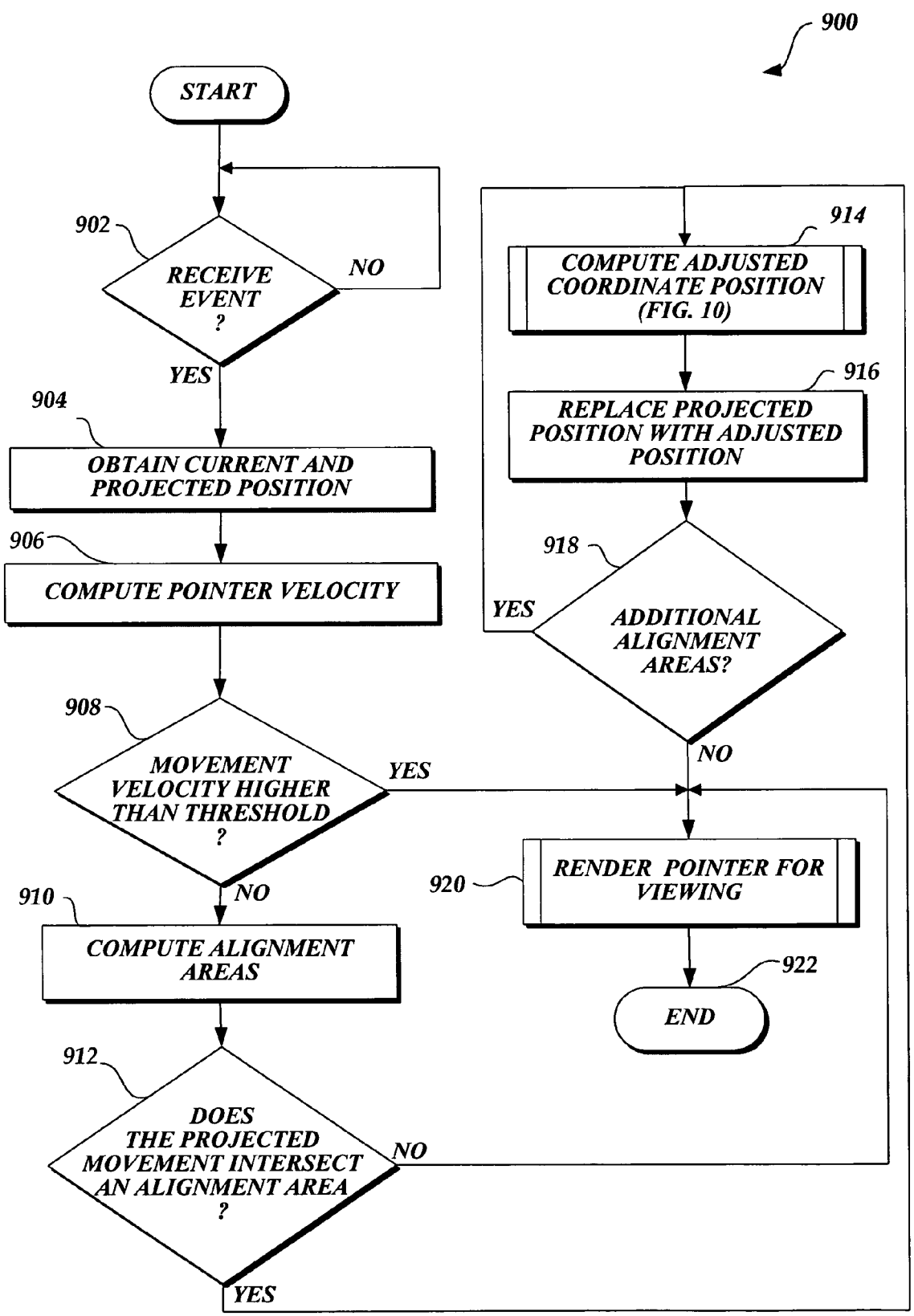
FIG. 9 is a flow diagram illustrating one exemplary embodiment of a pointer positioning method that determines how to adjust pointer movement in accordance with the present invention.

FIG. 9 is a flow diagram illustrating one exemplary embodiment of a pointer positioning method 900 formed in accordance with the present invention. In summary, the pointer positioning method 900 receives notice that an input device is generating pointer movement. The method 900 determines if the projected movement of the pointer will intersect an alignment area. If the projected movement does not intersect an alignment area, already realized (i.e., previously developed) pointer control software computes the new position of the pointer. Conversely, if the projected movement does intersect an alignment area, aspects of the present invention compute an adjusted position for the pointer. With continuing reference to FIGS. 1-8 and the accompanying descriptions, the exemplary pointer positioning method 900 illustrated in FIG. 9 will now be described.

The pointer positioning method 900 begins at block 902 where the method waits for a pointer movement event from an input device. For example, input device 110 will generate a pointer movement event and communicate the event to the operating system 104 when moved by a user. As described above, existing systems allow event-driven routines to receive notice of pointer movement events and perform actions in response to the events. In an exemplary embodiment, the event-driven routines of the present invention are implemented as callback functions, which are routines passed directly to the operating system 104 as parameters in a function call. When the operating system 104 receives a pointer movement event, execution of the pointer positioning method 900 is initiated by the operating system 104.

Upon receipt of a pointer movement event, the pointer positioning method 900 proceeds to block 904 where the method 900 obtains the current and projected position of the pointer. As known to those skilled in the art, the coordinate position of a pointer is generally represented as a 2-tuple that includes an x-coordinate and a y-coordinate. One location on a computer display is designated as the origin with the value of the 2-tuple being (0,0). When an input device generates a pointer movement event, routines that implement the present invention receive the current and projected position of the pointer from the operating system 104.

After the pointer positioning method 900 obtains the current and projected coordinate positions of the pointer, the pointer's projected velocity is computed. At block 906, the method 900 obtains the time interval for the pointer movement event received at block 902 and computes the pointer movement velocity using mathematical functions and computer-implemented routines generally known in the art.

Once the pointer movement velocity is known, the pointer positioning method 900 proceeds to decision block 908 where the method 900 determines whether the pointer movement velocity computed at block 906 is higher than a predetermined threshold. In one embodiment of the present invention, pointer movement is not adjusted in an alignment area when the projected velocity of the pointer is higher than a predetermined threshold. In this embodiment, the method 900 assumes that a user generating rapid pointer movement is not attempting to align a GUI object. If the projected pointer velocity is higher than the predetermined threshold, the method 900 proceeds to block 918 described below. Conversely, if projected pointer velocity is lower or equal to the predetermined threshold, the method 900 proceeds to decision block 910.

At block 910, the method 900 computes the coordinate positions on the computer display of the alignment areas. As described above, alignment areas are derived from specified locations in GUI objects such as a connection point or shape vertices. Since each GUI object has characteristics that determine an aligned coordinate position, alignment areas vary depending on the GUI objects being aligned. Also, the coordinate position of alignment areas (i.e. locations on the computer display where pointer movement in non-linear) depends on the pointer's position in relation to the selected GUI object. Thus, an offset value for the pointer is calculated that allows the method 900 to determine the location of the alignment areas.

At decision block 912, the method 900 determines whether the pointer movement event received at block 902 causes the pointer to intersect an alignment area. The present invention maintains an interface that allows computer programs, such as application 108, to define and use alignment areas. Aspects of the present invention track the shape, location, and size of all alignment areas on the computer display. The method 900 is able to determine whether the pointer movement event received at block 902 causes the pointer to intersect an alignment area by comparing the projected movement of the pointer with the coordinate positions occupied by alignment areas. If the projected movement of the pointer does not intersect an alignment area, the method 900 proceeds to block 920 described below. Conversely, if the projected movement of the pointer does intersect an alignment area, the method 900 proceeds to block 914.

Since the projected movement of the pointer intersects an alignment area, an aspect of the present invention computes an adjusted coordinate position for the pointer. At block 914, the adjusted coordinate position is calculated. One embodiment of a method for calculating an adjusted pointer position in accordance with the present invention is described below with reference to FIGS. 10-12.

At block 916, the pointer positioning method 900, replaces the projected coordinate position of the pointer with the adjusted coordinate position calculated at block 914. At block 916, the method communicates the adjusted coordinate position to the operating system 104 with software engineering techniques generally known in the art. Also at block 916, the method 900 passes information to the operating system 104 that indicates whether the pointer intersected an alignment area so that computer programs that implement the present invention can provide visual, auditory, or tactile feedback to users when GUI objects are aligned.

At decision block 918, a test is conducted to determine whether the event received at block 902 causes the pointer to intersect another alignment area. As described above at block 912, the method 900 determines whether an event causes the pointer to intersect an alignment area by comparing the projected movement of the pointer with the shape, location, and size of existing alignment areas. Thus, when a pointer event causes the pointer to intersect multiple alignment areas, calculation of adjustment amounts occurs in the order of intersection. If the projected movement of the pointer does intersect another alignment area, the method 900 proceeds back to block 914 and blocks 914 through 918 are repeated until pointer movement is adjusted in all alignment areas. Conversely, if the projected movement of the pointer does not intersect another alignment area, the method 900 proceeds to block 920.

At block 920 the pointer is rendered for viewing at the coordinate position calculated at block 914. Since existing systems for rendering a pointer for viewing on a computer display are well known to those skilled in the art, the pointer rendering process is not described here. Then at block 922, the pointer positioning method 900 terminates.

It should be understood that embodiments of the present invention are not limited to the method as shown in FIG. 9. Some embodiments may include additional actions or eliminate some of the actions shown in FIG. 9. For example, pointer movement may be adjusted regardless of pointer velocity. In this example, block 908, which determines whether the projected pointer movement is within a velocity threshold would be eliminated.

Figure 10:
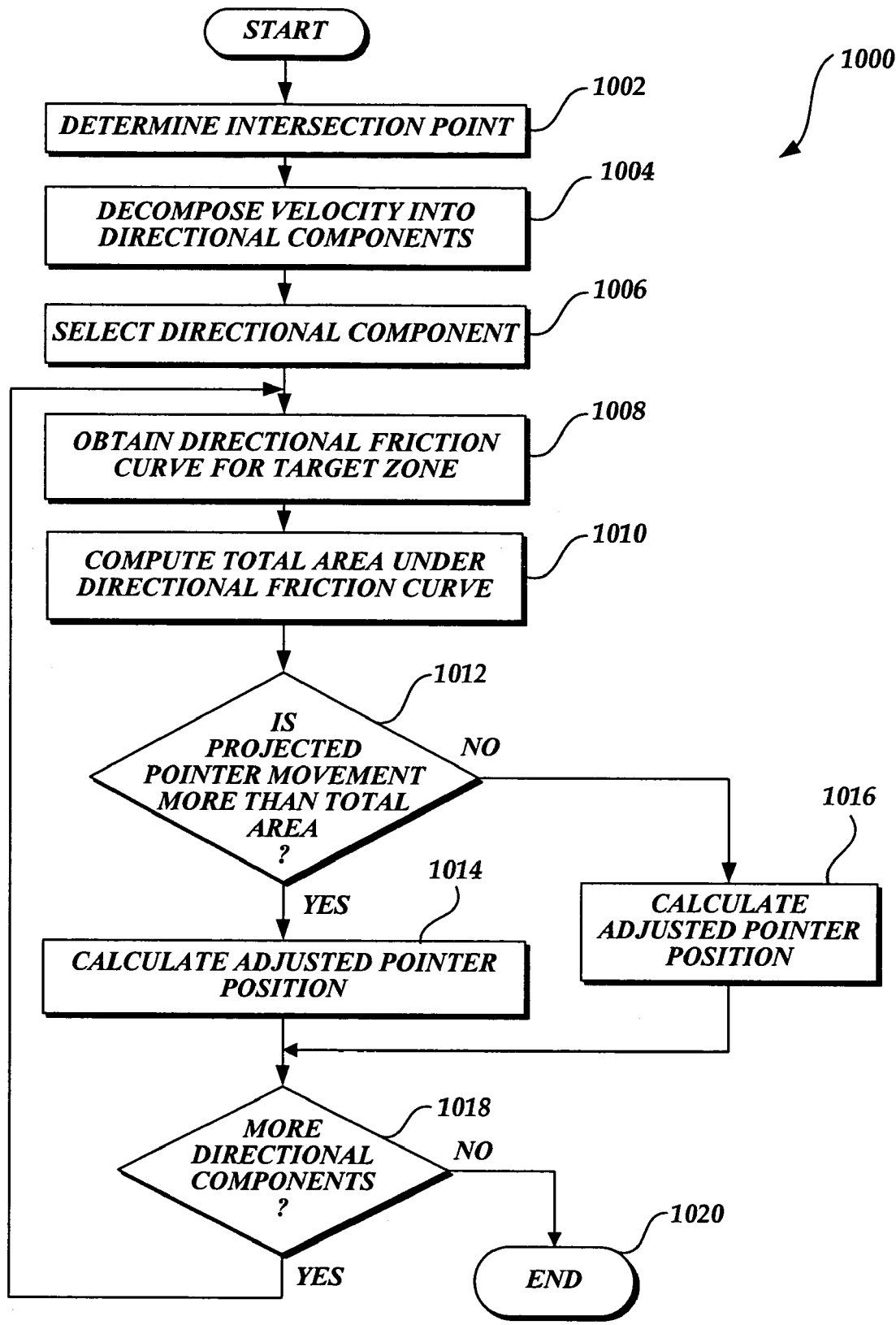
FIG. 10 is a flow diagram illustrating one exemplary embodiment of a calculation method that calculates an adjusted pointer position when the pointer intersects an alignment area, suitable for use in FIG. 9.

FIG. 10 is a flow diagram illustrating one exemplary embodiment of a calculation method 1000 formed in accordance with the present invention. With continuing reference to FIGS. 1-9 and the accompanying descriptions, the exemplary calculation method 1000 illustrated in FIG. 10 will now be described. The calculation method 1000 begins at block 1002 where the method 1000 determines the coordinate position where the pointer intersects an alignment area. As described above, aspects of the present invention receive the current and projected coordinate position of the pointer and track the size, shape, and location of alignment areas. With this information, the calculation method 1000 is able to calculate the coordinate position where the pointer intersects an alignment area using mathematical functions and computer implemented routines generally known in the art.

At block 1004 the projected movement of the pointer is decomposed into directional components. The movement of any entity, such as a pointer is capable of being expressed mathematically as a vector. As known to those skilled in the art and others, a vector is a quantity that has both a magnitude and a direction. In a two-dimensional environment, pointer movement may be decomposed into a horizontal component and a vertical component which permits calculation of the change in pointer position in both the vertical and horizontal directions, respectively.

At block 1006 the calculation method 1000 selects a directional component of the pointer's movement. For each directional component selected, the calculation method 1000 adjusts the projected movement of the pointer in the component direction. For the sake of convenience, much of the description herein is provided in the context of a two dimensional environment where adjustment occurs in the vertical direction and the horizontal direction. However, it should be understood that the present invention is also applicable in other environments, such as three-dimensional environments. References and examples herein to two-dimensional environments are only illustrative and should not be construed as limiting the applications of the invention.

Figure 11:
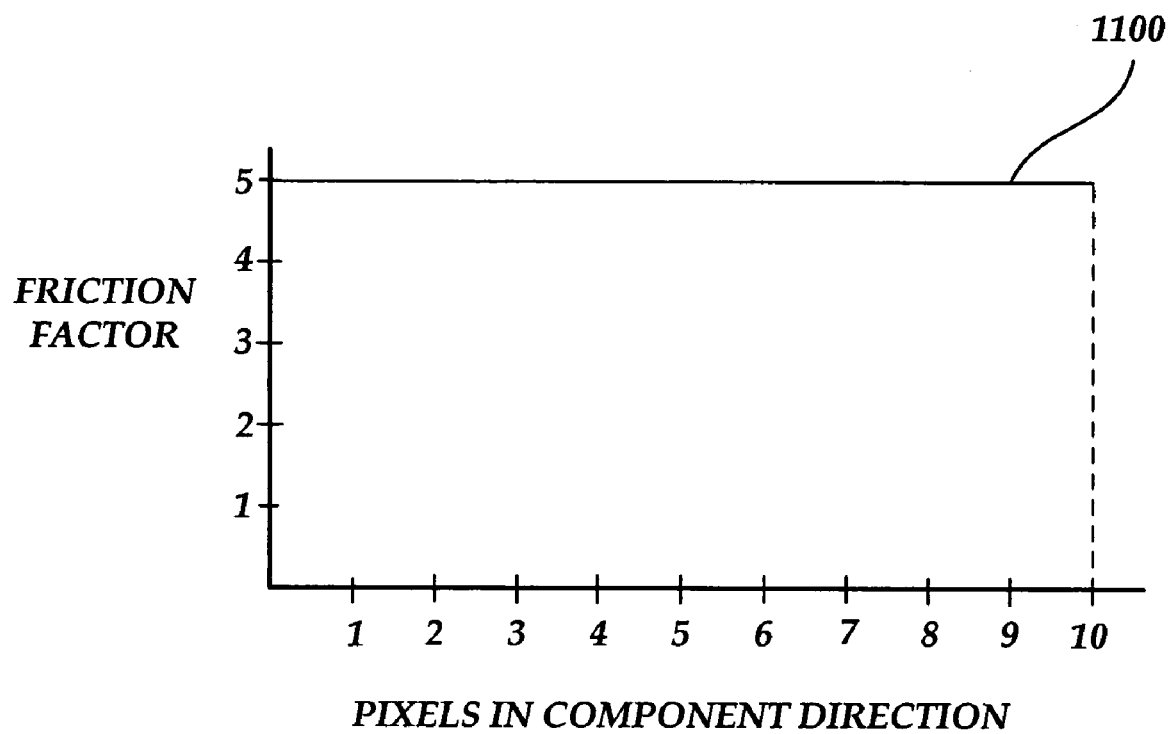
FIG. 11 is a pictorial depiction of a representative directional friction curve that illustrates calculation of resistance to pointer movement in accordance with the present invention.
Figure 12:
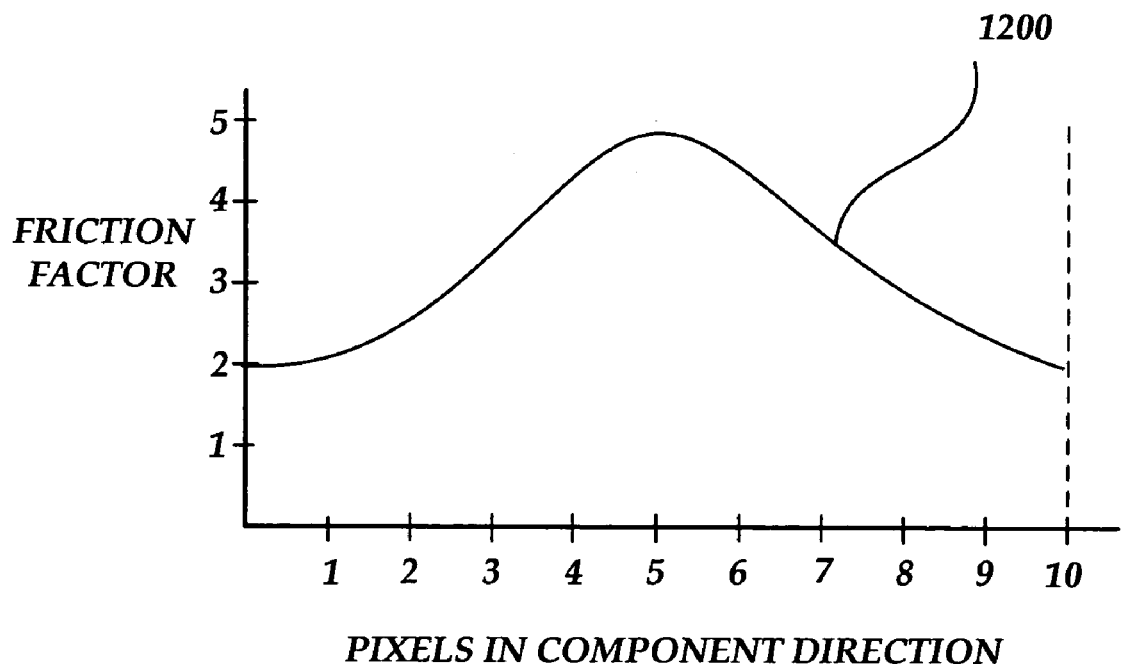
FIG. 12 is a pictorial depiction of a representative directional friction curve that illustrates calculations of resistance to pointer movement in accordance with the present invention.
Figure 13:
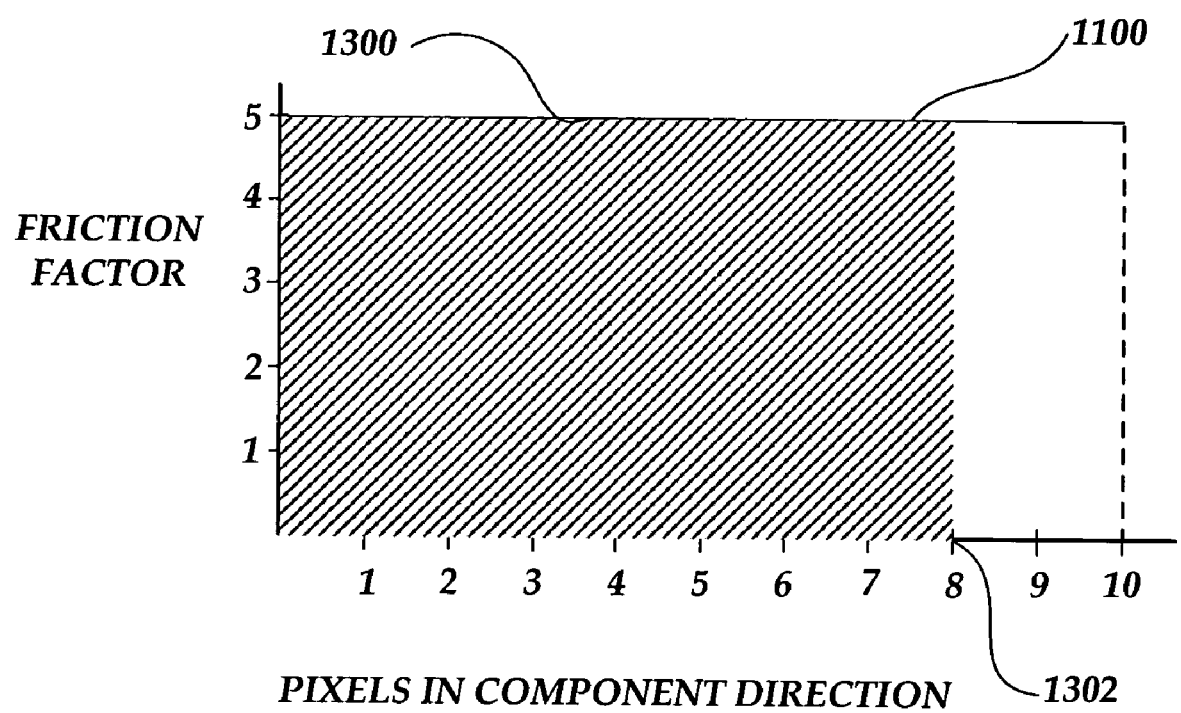
FIG. 13 is a pictorial depiction of the directional friction curve illustrated in FIG. 11, that illustrates calculation of resistance to pointer movement in accordance with the present invention.

At block 1008 the calculation method 1000 obtains a directional friction curve that quantifies resistance to pointer movement in the alignment area that the pointer is projected to intersect. The amount that pointer movement is adjusted depends on three variables; (1) friction factor (2) alignment area size, and (3) shape of the friction curve. As described above with reference to FIGS. 3-4, the friction factor is a variable that quantifies each pixel's resistance to pointer movement. The degree in which pixels resist pointer movement (i.e., friction factor) may vary depending on the purpose of the GUI. Also, the friction factor may vary depending on attributes of pointer movement. For example, a user generating rapid pointer movement is less likely to be attempting to place a pointer on a target. Resistance to pointer movement may be dependent on another variable such as pointer velocity. Alignment area size (i.e., the number of pixels in a component direction) affects adjustment of pointer movement in that larger alignment areas cause greater total resistance to pointer movement than smaller alignment areas. Exemplary friction curves are illustrated in FIGS. 11-13 and discussed in greater detail below. In summary, a friction curve plots the size of an alignment area against the friction factor assigned to an alignment area so that necessary adjustments to pointer movement may easily be calculated.

For illustrative purposes, representative directional friction curves are illustrated in FIG. 11-13. In the example illustrated in FIG. 11, alignment area size (i.e., number of pixels in a component direction) is plotted on the x-axis and the friction factor is plotted on the y-axis. FIG. 11 illustrates a constant directional friction curve 1100, i.e., a constant resistance to pointer movement directional friction curve. As described above with reference to FIG. 9, the present invention allows computer programs, such as application 108 to define alignment areas of different size, shape, and location. Also, as described above with reference to FIG. 4, alignment areas may be defined with different values assigned to their friction factor which allows developers to customize an alignment area to match the needs of a computer program. In an alternative embodiment of the present invention, the velocity of a pointer is increased in a alignment area. In this embodiment, the friction factor assigned to an alignment area is smaller than the friction factor assigned to areas of a computer display that generate linear pointer movement. Typically, a friction factor of one (1) is assigned to areas of the computer display that generate linear pointer movement. Thus, a friction factor that is greater than the value one (1) will create resistance to pointer movement and a value less than one (1) will cause the velocity of the pointer to increase. Aspects of the present invention track the attributes of an alignment area and generate friction curves, such as directional friction curve 1100.

FIG. 12 illustrates a friction curve 1200 that is not linear in that resistance to pointer movement in an alignment area varies depending on the pointer's location in the alignment area. Similar to FIG. 11, the size of an alignment area (i.e., number of pixels in a component direction) is plotted on the x-axis and the friction factor assigned to the alignment area is plotted on the y-axis. In one embodiment of the present invention, computer programs may define alignment areas with non-linear friction factors. Again, aspects of the present invention track the attributes assigned to an alignment area and generate an appropriate directional friction curve.

Returning to FIG. 10, the calculation method 1000, at block 1010, computes the total area under the directional friction curve obtained at block 1008. As will be described in more detail below, the area under the directional friction curve is a measure of total resistance to pointer movement over one component direction in an alignment area. In some instances, pointer movement will be adjusted by the total area under the directional friction curve. In other instances, a portion of the area under the directional friction curve is used to calculate the adjustment amount.

At decision block 1012, a test is conducted to determine whether the area under the directional friction curve, calculated at block 1010, is larger than the selected directional component of the pointer's movement. If the area under the directional friction curve is larger than the selected directional component of the pointer's movement, the pointer will remain inside the alignment area after the adjustment of pointer movement. In this instance, a portion of the area under the directional friction curve is used to calculate the adjustment amount. Conversely, if the area under the directional friction curve is not larger than the selected directional component of the pointer's movement, the pointer will move outside the alignment area. In this instance, the total area under the directional friction curve, which represents total resistance to pointer movement is the adjustment amount. If the area under the directional friction curve is larger than the selected directional component of the pointer's movement, the calculation method 1000 proceeds to block 1016 described below. Conversely, if the area under the directional friction curve is not larger than the selected directional component of the pointer's movement, the method 1000 proceeds to block 1014.

At block 1014, the calculation method 1000 reduces pointer movement in the selected component direction by the total area under the directional friction curve. For example, if the projected movement of the pointer after intersecting an alignment area that is ten (10) pixels in length is fifty (50) pixels and the area under the directional friction curve is thirty (30) units, the final pointer movement in the component direction is twenty (20) pixels (50 pixels−30 pixels=20 pixels) plus the length of the alignment area. Since the alignment area is ten (10) pixels, the total pointer movement is thirty (30) pixels (20 pixels+10 pixels=30 pixels) Then the method 1000 proceeds to block 1018 described in detail below.

If the calculation method 1000 reaches block 1016, the area under the directional friction curve is more than the pointer movement in the selected component direction. In this situation, only a portion of the area under the directional friction curve is used to calculate the adjustment amount. As described above with reference to FIGS. 11-12, the size (i.e., number of pixels in a component direction) of an alignment area is plotted on the x-axis of a directional friction curve. At block 1016, the calculation method 1000 determines the point on the x-axis where the area under the directional friction curve is equal to the projected movement of the pointer in the selected component direction. The area under the directional friction curve before this point is used to calculate the adjustment amount.

Calculation of the adjustment amount at block 1016 is best described with an example. FIG. 13 is an illustration of the directional friction curve 1100 depicted in FIG. 11. As described above, the directional friction curve 1100 plots the size of an alignment area (i.e., number of pixels in a component direction) on the x-axis and the friction factor on the y-axis. Together these variables form a directional friction curve 1100 where constant resistance to pointer movement in one component direction is generated. As illustrated in FIG. 13, the total area 1300 under the direction friction curve 1100 is equal to 50 units (5 friction factor×10 pixels=50 units). If the projected movement of the pointer after intersecting the alignment area is forty (40) pixels, then the adjustment amount is equal to thirty-two (32) pixels. As described above, the calculation method 1000 determines the point 1302 on the x-axis of the directional friction curve 1100 where the area under the curve is equal to the projected movement of the pointer. In the example illustrated in FIG. 13, the point 1302 on the x-axis where the area under the directional friction curve equals the projected movement in the selected component direction is at 8 pixels. The point 1302 on the x-axis where the area under the directional friction curve is equal to the projected movement is subtracted from the projected movement to obtain the adjustment amount. In the example illustrated in FIG. 13, the adjustment amount is equal to thirty-two (32) pixels (40 pixels−8 pixels=32 pixels) and the final pointer movement in the selected component direction is eight (8) pixels (40 pixels−32 pixels=8 pixels).

Returning to FIG. 10, at decision block 1018, a test is conducted to determine whether all directional components of the pointer's movement have been adjusted. If a directional component of the pointer's movement has not been adjusted, the calculation method 1000 proceeds back to block 1008 and blocks 1008 through 1018 are repeated until adjustments are made in each component direction. Conversely, if all necessary adjustments have been made, the method 1000 proceeds to block 1020 where it terminates.

It should be understood that implementations of the present invention are not limited to the method as shown in FIG. 10. Other embodiments may include additional actions or replace some of the actions shown in FIG. 10. For example, one embodiment of the present invention increases the velocity of a pointer in an alignment area. In this embodiment, the friction factor assigned to an alignment area is smaller than the friction factor assigned to areas of a computer display that generate linear pointer movement. The calculation method 1000 may be altered to account for values that increase pointer velocity in an alignment area.

Figure 14:
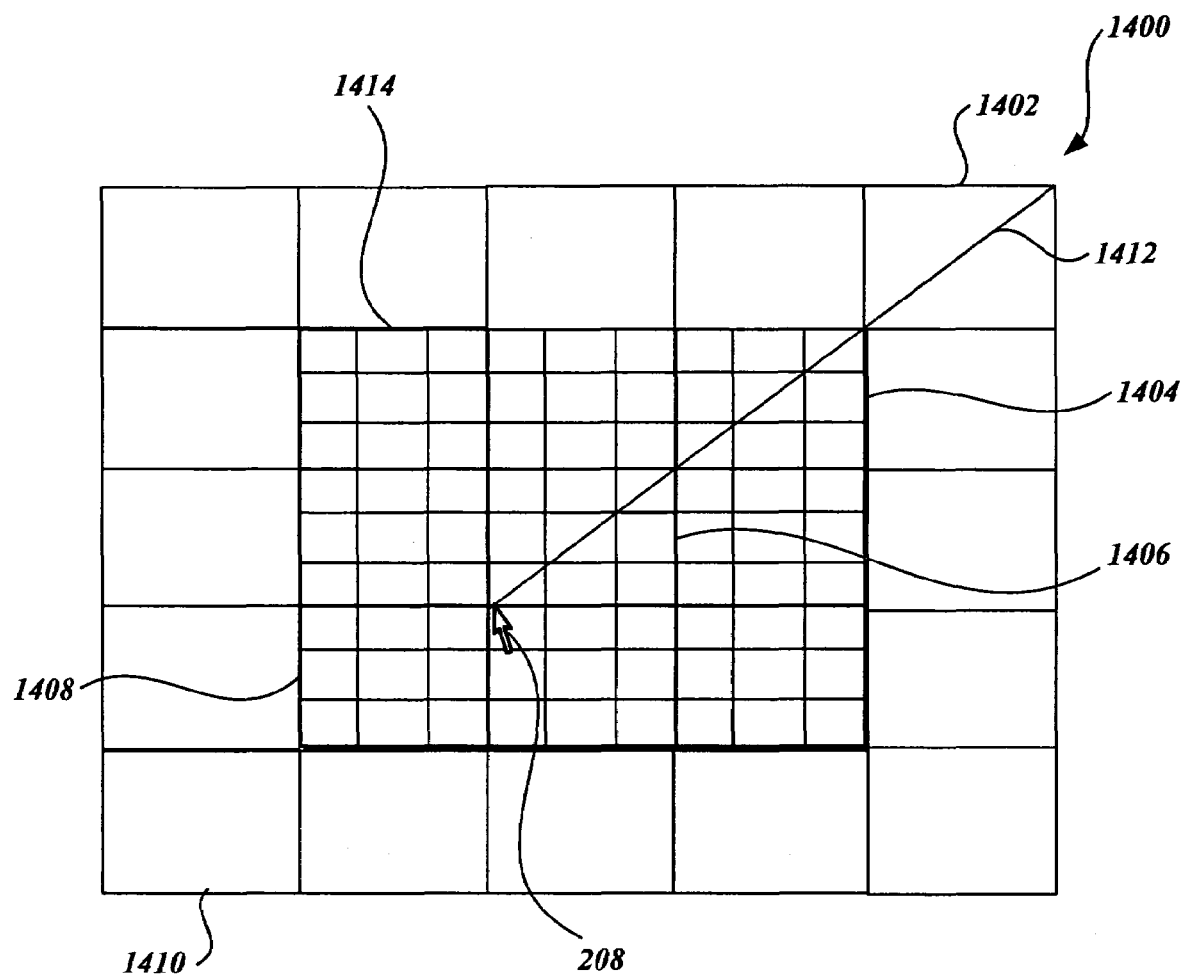
FIG. 14 is a pictorial depiction of the section of computer display that illustrates pointer movement in an alignment area in accordance with the present invention.

For illustrative purposes, a representative section of computer display 1400 that contains a set of highly magnified pixels is depicted in FIG. 14. More specifically, the sample section of computer display 1400 contains pixels 1402, 1404, 1406, 1408, 1410, a pointer 208, and a path 1412 that represents pointer 208 movement. As shown in FIG. 14, a user employed input device, such as input device 110, is used to relocate the pointer 208 across pixels 1402, 1404, and 1406. Pointer 208 movement across pixels 1404 and 1406 is not proportional to the input generated by the user because pixels 1404 and 1406 are part of a 3×3 pixel alignment area 1414. As described above with reference to FIGS. 9-10, when the pointer 208 intersects an alignment area, such as alignment area 1414, the pointer adjustment method 900 (FIG. 9) and the calculation method 1000 (FIG. 10) adjust movement of the pointer 208 to help users align GUI objects. To determine the adjustment amount, the calculation method 1000 obtains directional friction curves that quantify resistance to pointer movement in each direction that the pointer 208 is projected to move. In the example illustrated in FIG. 14, the pointer 208 is projected to move in both the horizontal (e.g. x-directional component) and vertical (e.g. y-directional component) directions. The directional friction curves obtained by the calculation method 1000 are linear because resistance to pointer movement in each component direction is constant.

In FIG. 14, the path 1412 represents pointer 208 movement generated by a single pointer 208 movement event. As illustrated in FIG. 14, the final location of the pointer 208 is inside the alignment area 1414. As described above with reference to FIG. 10 (blocks 1012-1016), when the final location of the pointer 208 is inside an alignment area, the area under the directional friction curves is larger than the projected movement of the pointer 208 in each component direction. In this situation, only a portion of the area under each directional friction curve is used to calculate an adjustment amount. Conversely, if the final location of the pointer 208 is outside the alignment area 1412, the total area under the directional friction curves would be used as the adjustment amounts.

While presently preferred embodiments of the invention have been illustrated and described, it is to be understood that within the scope of the appended claims the invention can be practiced in other ways than those specifically described herein.

The embodiments of the invention in which an exclusive property or privilege is claimed are defined as follows:

1. In a computer device that includes a display for displaying a graphical user interface that includes a pointer, a pointer input device, and an operating system, a method of assisting users in aligning a selected object with an object displayed on the graphical user interface comprising:

in response to receiving notice of a pointer movement event, obtaining the current and projected coordinate positions of the pointer;

determining if the pointer will intersect an alignment area during movement;

if the pointer an intersects an alignment area during movement, calculating an adjusted coordinate position for the pointer, wherein calculating an adjusted coordinate position for the pointer includes:

calculating the coordinate position where the pointer intersects the alignment area; and for each directional component in the projected movement of the pointer from the current to the projected coordinate positions ("projected movement"):

determining the projected change in pointer location;

determining an adjustment amount based on the attributes of the alignment area, wherein determining an adjustment amount includes:

calculating the total amount of resistance generated by the alignment area;

if the total amount of resistance is larger than the projected change in pointer location, determining that the adjustment amount equals the total amount of resistance; and alternatively if the total amount of resistance is not larger than the projected change in pointer location, determining the adjustment amount by calculating the point on a directional friction curve where the projected pointer movement equals the area under the directional friction curve.

2. The method of claim 1 further comprising communicating to the operating system of the computer device that the pointer will achieve an aligned coordinate position if the pointer intersects an alignment area.

3. The method of claim 1 further comprising displaying the pointer on the display of the computer device at the adjusted coordinate position.

4. The method of claim 1, wherein the current and projected coordinate positions of the pointer are obtained from the operating system of the computer device.

5. The method of claim 1, wherein determining if the pointer will intersect an alignment area includes:

identifying the coordinate positions on the display of time computer device occupied by an alignment area; and comparing the coordinate position occupied by the alignment area with the movement of the pointer from the current to the projected coordinate positions.

6. The method of claim 1, wherein the alignment area that a pointer may intersect is aligned with an object displayed on a graphical user interface.

7. The method of claim 1, wherein calculating the coordinate position where the pointer intersects an alignment area includes:

identifying the coordinate position occupied by the alignment area; and comparing the coordinate position occupied by the alignment area with the projected movement of the pointer.

8. The method of claim 1, wherein determining the projected change in pointer location includes:

calculating the projected movement of the pointer; and expressing the projected movement of the pointer as a vector.

9. The method of claim 1, wherein calculating the total amount of resistance generated by the alignment area includes:

generating a directional friction curve for the alignment area; and determining the area under the directional friction curve.

10. The method of claim 1, wherein the directional friction curve is a linear directional friction curve indicative of constant resistance to pointer movement.

11. The method of claim 1, wherein the directional friction curve is a non-linear directional friction indicating that the resistance to pointer movement depends on the location of the pointer in the alignment area.

12. In a computer device that maintains a graphical user interface that includes a pointer and an alignment area, a method of calculating an adjusted coordinate position where the pointer will intersect the alignment area in response to the pointer being moved to the alignment area comprising:
   calculating the coordinate position where the pointer intersects the alignment area; and
   for each directional component in the projected movement of the pointer from the current to the projected coordinate positions ("projected movement"):
      determining the projected change in pointer location;
      determining an adjustment amount based on the attributes of the alignment area, wherein determining an adjustment amount includes:
         calculating the total amount of resistance generated by the alignment area;
         if the total amount of resistance is larger than the projected change in pointer location, determining that the adjustment amount equals the total amount of resistance; and
         alternatively if the total amount of resistance is not larger than the projected change in pointer location, determining the adjustment amount by calculating the point on a directional friction curve where the projected pointer movement equals the area under the directional friction curve; and
      reducing the projected change in pointer location by said adjustment amount.

13. The method of claim 12, wherein calculating the coordinate position where the pointer intersects an alignment area includes:
   identifying the coordinate position occupied by the alignment area; and
   comparing tile coordinate position occupied by the alignment area with the projected movement of the pointer.

14. The method of claim 12, wherein determining the projected change in pointer location includes:
   calculating the projected movement of the pointer; and
   expressing the projected movement of the pointer as a vector.

15. The method of claim 12, wherein calculating the total amount of resistance generated by an alignment area includes:
   generating a directional friction curve for tile alignment area; and
   determining the area under tile directional friction curve.

16. The method of claim 15, wherein the directional friction curve is a linear directional friction curve indicative of constant resistance to pointer movement.

17. The method of claim 15, wherein the directional friction curve is a non-linear directional friction indicating that the resistance to pointer movement depends on the location of the pointer ill the alignment area.

18. A computer-readable medium containing computer-readable instructions which, when executed by a computer device that includes a display for displaying a graphical user interface including a pointer, a pointer input device and an operating system, performs a method that assists users in aligning a selected object with an object displayed on a graphical user interface, comprising:
   in response to receiving notice of a pointer movement event, obtaining the current and projected coordinate positions of the pointer;
   determining if the pointer will intersect an alignment area during movement;
   if the pointer intersects an alignment area during movement, calculating an adjusted coordinate position for the pointer, wherein calculating an adjusted coordinate position for the pointer includes:
      calculating the coordinate position where the pointer intersects the alignment area; and
      for each directional component in the projected movement of the pointer from the current to the projected coordinate positions ("projected movement"):
         determining the projected change in pointer location;
         determining an adjustment amount based on the attributes of the alignment area, wherein determining an adjustment amount includes:
            calculating the total amount of resistance generated by the alignment area;
            if the total amount of resistance is larger than the projected change in pointer location, determining that the adjustment amount equals the total amount of resistance; and
            alternatively if the total amount of resistance is not larger than the projected change in pointer location, determining the adjustment amount by calculating the point on a directional friction curve where the projected pointer movement equals the area under the directional friction curve.

19. The computer-readable medium of claim 18 further comprising communicating to the operating system of the computer device that the pointer will achieve an aligned coordinate position if the pointer intersects an alignment area.

20. The computer-readable medium of claim 18 further comprising displaying the pointer on the display of the computer device at the adjusted coordinate position.

21. The computer-readable medium of claim 18, wherein the current and projected coordinate positions of the pointer are obtained from the operating system of the computer device.

22. The computer-readable medium of claim 18, wherein determining if the pointer will intersect an alignment area includes:
   identifying the coordinate positions on the display of the computer device occupied by an alignment area; and
   comparing the coordinate position occupied by the alignment area with the movement of the pointer from the current to the projected coordinate positions.

23. The computer-readable medium of claim 18, wherein the alignment area that a pointer may intersect is aligned with an object displayed on a graphical user interface.

24. The computer-readable medium of claim 18, wherein calculating the coordinate position where the pointer intersects an alignment area includes:
   identifying the coordinate position occupied by the alignment area; and
   comparing the coordinate position occupied by the alignment area with the projected movement of the pointer.

25. The computer-readable medium of claim 18, wherein determining the projected change in pointer location:
   calculating the projected movement of the pointer; and
   expressing the projected movement of the pointer as a vector.

26. The computer-readable medium of claim 18, wherein calculating the total amount of resistance generated by the alignment area includes:

generating a directional friction curve for the alignment area; and determining the area under the directional friction curve.

27. The computer-readable medium of claim 18, wherein the directional friction curve is a linear directional friction curve indicative of constant resistance to pointer movement.

28. The computer-readable medium of claim 18, wherein The directional friction curve is a non-linear directional friction indicating that the resistance to pointer movement depends on the location of the pointer in the alignment area.

* * * * *